(12) United States Patent
Campbell et al.

(10) Patent No.: US 11,909,199 B2
(45) Date of Patent: Feb. 20, 2024

(54) FUNCTIONAL SAFETY TECHNIQUES FOR INDUSTRIAL AUTOMATION DEVICES

(71) Applicant: ROCKWELL AUTOMATION TECHNOLOGIES, INC., Mayfield Heights, OH (US)

(72) Inventors: Al J. Campbell, New Berlin, WI (US); John David Allan, Cambridge (CA); Marius G. Chis, Cambridge (CA); Reginald A. Drake, Waterloo (CA); Scott D. Braun, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 337 days.

(21) Appl. No.: 17/165,623

(22) Filed: Feb. 2, 2021

(65) Prior Publication Data

US 2022/0247165 A1    Aug. 4, 2022

(51) Int. Cl.
*H02H 7/20* (2006.01)
*G05B 19/05* (2006.01)
*H02H 1/00* (2006.01)

(52) U.S. Cl.
CPC .............. *H02H 7/20* (2013.01); *G05B 19/058* (2013.01); *H02H 1/0092* (2013.01); *G05B 2219/14116* (2013.01)

(58) Field of Classification Search
CPC ........ G05B 19/058; G05B 2219/14116; G05B 2219/24125; G05B 2219/25158; G05B 19/048; G05B 23/0291; H02H 7/20; H02H 1/0092; H02P 27/06; H02M 1/088
See application file for complete search history.

(56) References Cited

U.S. PATENT DOCUMENTS

| | | |
|---|---|---|
| 7,253,577 B2 | 8/2007 | Campbell et al. |
| 8,046,179 B2 | 10/2011 | Campbell et al. |
| 8,848,324 B2 | 9/2014 | Fullington et al. |
| 9,577,424 B2 | 2/2017 | Campbell |

(Continued)

FOREIGN PATENT DOCUMENTS

CN        111736514 A        10/2020

OTHER PUBLICATIONS

Extended European Search Report for EP137558 (Application No. 22151568.7), dated Jun. 28, 2022, 13 pages.

*Primary Examiner* — Robert E Fennema
*Assistant Examiner* — Christopher W Carter
(74) *Attorney, Agent, or Firm* — Fletcher Yoder, P.C.

(57) ABSTRACT

A method may include receiving, by respective processing circuitry of one or more power modules of an industrial automation device, a control signal from a controller of the industrial automation device. The power modules may include driver circuitry and a power converter that may provide power to a motor based on the signal. The method may also include, detecting, by the respective processing circuitry, a lack of communication from the controller based on the signal, and, in response to detecting the lack of communication from the controller, transmitting, by the respective processing circuitry, a first command to gating signal enable circuitry to disable the driver circuitry, and transmitting, by the respective processing circuitry, a second command to driver power circuitry to prevent power from being provided to the driver circuitry.

20 Claims, 3 Drawing Sheets

(56) References Cited

U.S. PATENT DOCUMENTS

| | | | |
|---|---|---|---|
| 10,536,058 B2 * | 1/2020 | Kim | H02P 23/00 |
| 2010/0088047 A1 | 4/2010 | Campbell et al. | |
| 2012/0013284 A1 * | 1/2012 | Campbell | H02H 7/08 |
| | | | 318/490 |
| 2016/0141865 A1 | 5/2016 | Drake et al. | |

* cited by examiner

FUNCTIONAL SAFETY TECHNIQUES FOR INDUSTRIAL AUTOMATION DEVICES

BACKGROUND

The disclosure generally relates to controlling, monitoring, and disabling an industrial automation device. More particularly, embodiments of the present disclosure are related to systems and methods for implementing a functional safety mechanism to prevent power from being provided to an industrial automation device and verifying that circuitry used to implement the functional safety mechanism is functioning properly.

Industrial automation devices, such as medium voltage drives, are employed in a variety of environments. Under certain circumstances, these industrial automation devices are disabled and placed into a safe state. Accordingly, certain functional safety mechanisms may be designed to reliably disable the industrial automation devices under these circumstances. The design of such functional safety mechanisms may be designed to comply with certain functional safety standards, such as the International Electrotechnical Commission (IEC) 61508. One such functional safety mechanism involves the use of a Black Channel to send sophisticated safety messages between a controller of an industrial automation device and one or more power cells of the industrial automation device. However, implementation of a Black Channel may require the use of multiple intelligent devices, such as field-programmable gate arrays (FPGAs), in circuit board designs for the industrial automation device. This may lead to complex and expensive circuit board designs. Additionally, development of the safety messages may require extensive work in order to meet the functional safety standards. For example, code used to configure the intelligent devices in the circuit board design may be validated before implementation. Accordingly, it would be desirable to develop a simple, low-cost functional safety mechanism that may disable certain industrial automation devices and complies with functional safety standards.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory, computer-readable medium associated with an industrial automation device may include instructions that when executed by one or more processors, cause the processors to perform operations. The operations may include receiving one or more inputs indicative of a shutdown of one or more power modules of the industrial automation device. The operations may also include, in response to receiving the inputs, transmitting a first command to driver control circuitry to disable a driver communicatively coupled to one or more transmitters and transmitting a second command to transmitter control circuitry to prevent power from being provided to the transmitters. The driver may transmit a control signal via the transmitters to one or more respective power modules to control an operation of a power converter that may provide power to a motor. Each power module may receive the control signal from the driver via the transmitters, monitor the control signal for a lack of communication from the driver, and in response to detecting the lack of communication based on the control signal, disable driver circuitry of the power module that may control the operation of the power converter to provide power to the motor and prevent power from being provided to the driver circuitry.

In another embodiment, a method may include receiving, by respective processing circuitry of one or more power modules of an industrial automation device, a control signal from a controller of the industrial automation device. The power modules may include driver circuitry and a power converter that may provide power to a motor based on the signal. The method may also include, detecting, by the respective processing circuitry, a lack of communication from the controller based on the signal, and, in response to detecting the lack of communication from the controller, transmitting, by the respective processing circuitry, a first command to gating signal enable circuitry to disable the driver circuitry, and transmitting, by the respective processing circuitry, a second command to drive power circuitry to prevent power from being provided to the driver circuitry.

In yet another embodiment, a system may include a controller that includes a driver communicatively coupled to one or more transmitters and first processing circuitry. The driver may transmit a control signal via the transmitters to one or more respective power modules. The first processing circuitry may receive one or more inputs indicative of a shutdown of the respective power modules and, in response to receiving the inputs, transmitting a first command to driver control circuitry communicatively coupled to the driver and transmitting a second command to transmitter control circuitry communicatively coupled to the transmitter. The first command may disable the driver, and the second command may prevent power from being provided to the transmitters. The system may also include a power module that may control an operation of a power converter to provide power to a motor. The power module is communicatively coupled to a first transmitter. The power module includes driver circuitry that may control the operation of the power converter, and second processing circuitry that may receive the control signal from the first transmitter, detect a lack of communication from the controller based on the control signal, and, in response to detecting the lack of communication, transmit a third command to gating signal circuitry to disable the driver circuitry and transmit a fourth command to drive power circuitry to prevent power from being provided to the driver circuitry.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
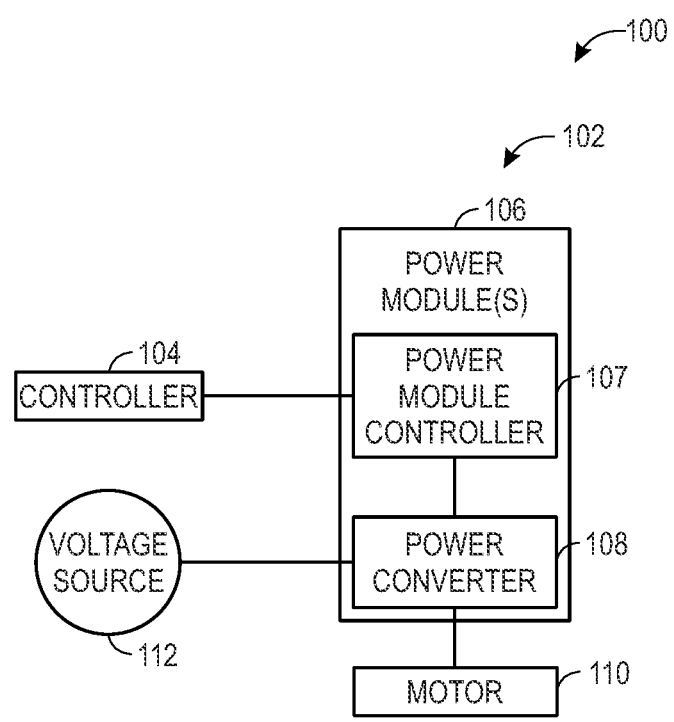
FIG. 1 is a block diagram of an exemplary medium voltage drive that includes control circuitry and one or more power modules of the medium voltage drive that may implement a functional safety mechanism to prevent power from being delivered to a motor from the medium voltage drive, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Industrial automation devices, such as medium voltage drives, are employed in a variety of environments. Under certain circumstances, these industrial automation devices may be disabled and placed into a safe state. Certain functional safety mechanisms may be designed to reliably disable the industrial automation devices. One such functional safety mechanism involves the use of a Black Channel to send sophisticated safety messages between a controller of an industrial automation device and one or more power cells of the industrial automation device to disable the industrial automation device. However, implementation of a Black Channel may involve the use of multiple intelligent devices, such as field-programmable gate arrays (FPGAs), in circuit board designs for the industrial automation device that may result in complex and expensive circuit board designs. Additionally, development of the sophisticated safety messages may involve extensive work in order to meet the functional safety standards, such as IEC 61508. For example, code used to configure the intelligent devices in the circuit board design may need to be validated before implementation.

Accordingly, the present disclosure is generally directed to a functional safety mechanism for an industrial automation device that may stop a communication stream between the controller of the industrial automation device and one or more power modules of the industrial automation device in order to disable the industrial automation device (e.g., place the power modules of the industrial automation device in a safe state). In certain embodiments, the industrial automation device may include a medium voltage drive having a controller and one or more power modules that may control the operation of one or more corresponding power converters to provide power to a motor. Although certain embodiments of the disclosure are described herein with reference to the functional safety mechanism implemented within a medium voltage drive (e.g., supply voltages of 2.3 kilovolts (kV) to 11 kV), it should be understood that the functional safety mechanism may be used with other industrial automation devices. For example, the industrial automation devices may include a low voltage drive (e.g., supply voltages below 2.3 kV), a high voltage drive (e.g., supply voltages above 11 kV), a multi-axis motion servo drive, a current source drive, or any other industrial automation device that may utilize a communication stream and may be placed in a functionally safe state without using dedicated safety messages.

During normal operation of the medium voltage drive, the controller of the medium voltage drive may transmit one or more messages (e.g., data or command(s)) via a serial-based communications link to the power modules(s) of the medium voltage drive. After receiving the messages from the controller, the power module(s) may control the operation of one or more corresponding power converters to provide power to the motor based on the particular messages received. In certain instances, the controller of the medium voltage drive may trigger a functional safety mechanism to place the power module(s) in a safe state. For example, the controller of the medium voltage drive may receive a command to initiate the functional safety mechanism from various devices communicatively coupled to the controller, such as an e-stop button, a programmable logic controller (PLC), a light curtain, or the like. In response to the functional safety mechanism being triggered, the controller of the medium voltage drive may (1) disable respective transmitters (e.g., turn off power to the transmitters) that relay the messages between the controller and the power module(s) and (2) disable generation of gating signals (e.g., enabling signals) that would control a driver of the controller to transmit one or more messages to the respective transmitters to relay the messages to the power module(s).

Additionally, each power module may include communication monitoring circuitry, such as a communication watchdog timer, that monitors for gaps in communication (e.g., a period of time lacking message transmission) from the controller. In response to the communication monitoring circuitry of the power module detecting a gap in communication from the controller (i.e., after the functional safety mechanism has been triggered), the power module may (1) disable driver circuitry of the power module (e.g., turn off power to the driver circuitry) that may generate one or more signals to control an operation of one or more corresponding power converters that provide power to the motor and (2) disable generation of one or more gating signals (e.g., one or more enabling signals) that would control the driver circuitry of the power module to generate the signals to control the operation of the corresponding power converter to provide power to the motor. As a result, the power module of the medium voltage drive may be disabled and placed in a safe state.

In this way, the functional safety mechanism provides multiple levels of redundancy by implementing different methods to prevent the transmission of signals from the controller to the power module(s) and different methods to prevent power from being provided to the motor. That is, to prevent the transmission of signals from the controller to the power module(s), the controller of the medium voltage drive may (1) disable the transmitters (e.g., turn off power to the transmitters) and (2) disable generation of the gating signals (e.g., the enabling signals) that would control the driver of the controller to transmit one or more messages to the respective transmitters to relay the messages to the power module(s). Additionally, to prevent power form being provided to the motor, the power module may (1) disable the driver circuitry of the power module (e.g., turn off power to the driver circuitry) and (2) disable generation of the gating signals (e.g., the enabling signals) that would control the driver circuitry of the power module to generate the signals to control the operation of the corresponding power converter to provide power to the motor.

Further, one or more diagnostic tests may be implemented within the medium voltage drives to verify the integrity of the circuitry that may be used to implement the functional safety mechanism in the controller of the medium voltage drive, in each power module of the medium voltage drive, or a combination thereof. In particular, a short test pulse (e.g., less than 100 nanoseconds) may be transmitted to one or more components of the controller of the medium voltage drive (e.g., transmitter control circuitry), one or more components of the power module(s) of the medium voltage drive (e.g., the driver control circuitry), or a combination thereof, to verify the integrity or the ability of whether such components can power down respective circuitry of the controller and the power module(s) when requested. The controller of the medium voltage drive may receive data that indicates whether the diagnostic tests of the respective components of the controller or the power module(s) were successful. If the data indicates a diagnostic test was unsuccessful, the controller may initiate the functional safety mechanism described herein.

With the foregoing in mind, FIG. 1 is a block diagram 100 of a medium voltage drive 102 that includes a controller 104 and one or more power module(s) 106 that may control the operation of one or more corresponding power converters 108 to provide power to a motor 110. In general, each power converter 108 may receive three-phase alternating current (AC) voltage from a voltage source 112 or a direct current (DC) voltage from the voltage source 112 and convert the AC voltage or DC voltage into a voltage suitable for powering a load. In this way, the power converter 108 may supply a voltage source 112 to the motor 110 via one or more inverters. For instance, the medium voltage drive 102 may control the speed, torque, or other suitable operation of the motor 110 by controlling characteristics of the voltage (e.g., amplitude or frequency) provided to the motor 110 via the inverters.

As mentioned above, the controller 104 of the medium voltage drive 102 may transmit one or more messages (e.g., data or command(s)) via a serial-based communications link to the power modules(s) 106 of the medium voltage drive 102 during normal operation of the medium voltage drive 102. After receiving the messages from the controller 104, the power module(s) 106 may generate one or more signals (e.g., pulse width modulation signals) to control the operation of the corresponding power converter(s) 108 to provide power to the motor 110 based on the particular messages received. In some embodiments, the motor 110 may be coupled to and drive one or more fans, one or more pumps, one or more compressors, or the like.

The controller 104 of the medium voltage drive 102 may receive a command to initiate a functional safety mechanism to shutdown the medium voltage drive 102. As described herein, the term "shutdown" may refer to a situation in which the power module(s) 106 of the medium voltage drive 102 are placed in a safe state or turned off such that the power module(s) 106 are not generating signals to control their corresponding power converters to provide power to the motor 110. In certain embodiments, the controller 104 of the medium voltage drive 102 may receive the command to initiate the functional safety mechanism from various devices communicatively coupled to the controller 104 via a network. For example, such devices may include an e-stop button, a programmable logic controller (PLC), a light curtain, or the like. It should be noted that any suitable network may be employed in the embodiments described herein. For instance, the network may include any wired or wireless network that may be implemented as a local area network (LAN), a wide area network (WAN), and the like. Indeed, other industrial communication network protocols, such as Ethernet/IP, Common Industrial Protocol (CIP) Safety, ProfiSafe, and the like, may also be used.

In response to receiving the command to initiate the functional safety mechanism, the controller 104 of the medium voltage drive 102 may send one or more respective commands to corresponding circuitry in the controller 104 of the medium voltage drive 102 to (1) disable one or more transmitters of the controller 104 that may relay messages between the controller 104 and the power module(s) 106 and (2) disable generation of gating signals (e.g., enabling signals) that would control a driver of the controller 104 to transmit one or more messages to the transmitters to relay the messages to the power module(s) 106. Each power module 106 may include communication monitoring circuitry that monitors for gaps in communication from the controller 104 to initiate the functional safety mechanism. For instance, the power module(s) 106 may initiate the functional safety mechanism in response to detecting a gap (e.g., a period of time lacking transmissions) in communication from the controller 104 to (1) disable driver circuitry of the power module 106 that may generate one or more signals (e.g., pulse width modulation signals) to control operation of a corresponding power converter to provide power to the motor 110 and (2) disable generation of gating signals (e.g., enabling signals) that would control the driver circuitry of the power module 106 to generate the signals to control the operation of the corresponding power converter. In some embodiments, the time period of the gap in communication may be greater than or equal to 100 milliseconds. However, it should be noted that any suitable time period may be used to trigger the power module 106 to initiate the functional safety mechanism. For example, the time period of the gap may be based on the transmission rate of data between the controller 104 and the power module(s) 106 and a required safety reaction time. In this way, the functional safety mechanism provides multiple levels of redundancy in disabling the medium voltage drive 102 by preventing messages from being transmitted from the controller 104 to the power module(s) 106 and preventing power from being provided to the motor 110.

In some embodiments, the medium voltage drive 102 may have up to twenty-seven, or more, power modules 106. However, it should be noted that the medium voltage drive 102 may have any suitable number of power modules 106 to deliver power to the motor 110 during normal operation of the medium voltage drive 102. Additionally, for each power module 106 of the medium voltage drive 102, the controller 104 may have a respective transmitter for transmitting messages from the controller 104 to a respective power module controller 107 that controls operation of its corresponding power converter 108 to provide power to the motor 110.

Additionally, during normal operation of the medium voltage drive 102, the controller 104 may periodically initiate one or more diagnostic tests to verify the integrity (e.g., ability) or the operability of the circuitry that may be used to implement the functional safety mechanism in the controller 104 of the medium voltage drive 102, the circuitry that may be used to implement the functional safety mechanism in each power module 106 of the medium voltage drive 102, or a combination thereof. In some embodiments, the controller 104 may initiate the diagnostic tests at 250 millisecond intervals, at 500 millisecond intervals, at one second intervals, or any other suitable interval. Each diagnostic test may include transmitting a test pulse to the circuitry of the controller 104 that may disable the transmitters of the controller 104, transmitting a test pulse to the circuitry of the controller 104 that may disable generation of enabling signals that would control the driver of the controller 104 to transmit the messages to the transmitters, transmitting a test pulse to the circuitry of the power module(s) 106 that may disable the driver circuitry of the power module 106 that generates one or more signals to control operation of a corresponding power converter to provide power to the motor 110, transmitting a test pulse to the circuitry of the power module(s) that may disable generation of the enabling signals that would control the driver circuitry of the power module 106 to generate the signals to control operation of the corresponding power converter, or a combination thereof. In some embodiments, the test pulse may be less than or equal to 100 nanoseconds, less than or equal to 80 nanoseconds, less than or equal to 60 nanoseconds, or any other suitable length such that the diagnostic test may determine whether the circuitry of the controller 104 and/or the circuitry of the power module(s) may perform the functional safety mechanism but not trigger the functional safety mechanism. That is, the diagnostic tests of the circuitry of the controller 104 and the circuitry of the power module(s) 106 may be carried out while the medium voltage drive 102 continues to operate to provide power to the motor 110.

The controller 104 may receive data indicative of the results of each diagnostic test. If one or more of the diagnostic tests returns an unsuccessful result, the controller 104 may initiate the functional safety mechanism to place the power module(s) 106 of the medium voltage drive 102 in a safe state. For example, if a diagnostic test of one of the power modules 106 of the medium voltage drive 102 determines that the circuitry of the power module 106 is not able to (1) disable the driver circuitry of the power module 106 or (2) disable generation of the enabling signals that would control the driver circuitry of the power module 106, or both, the controller 104 may initiate the functional safety mechanism described herein to place each power module 106 in a safe state.

Figure 2:
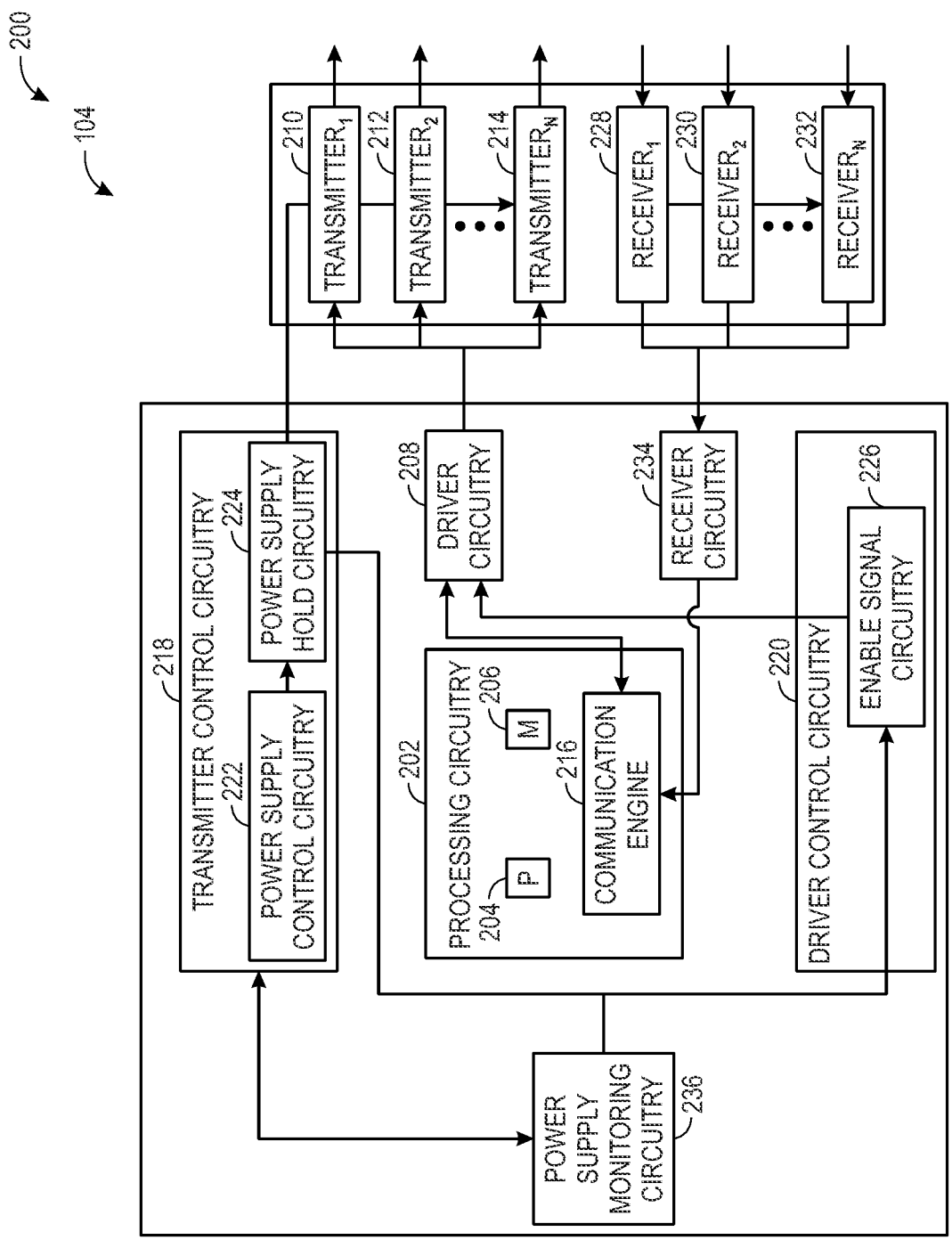
FIG. 2 is a block diagram of the control circuitry of the exemplary medium voltage drive of FIG. 1, in accordance with an embodiment.
Figure 3:
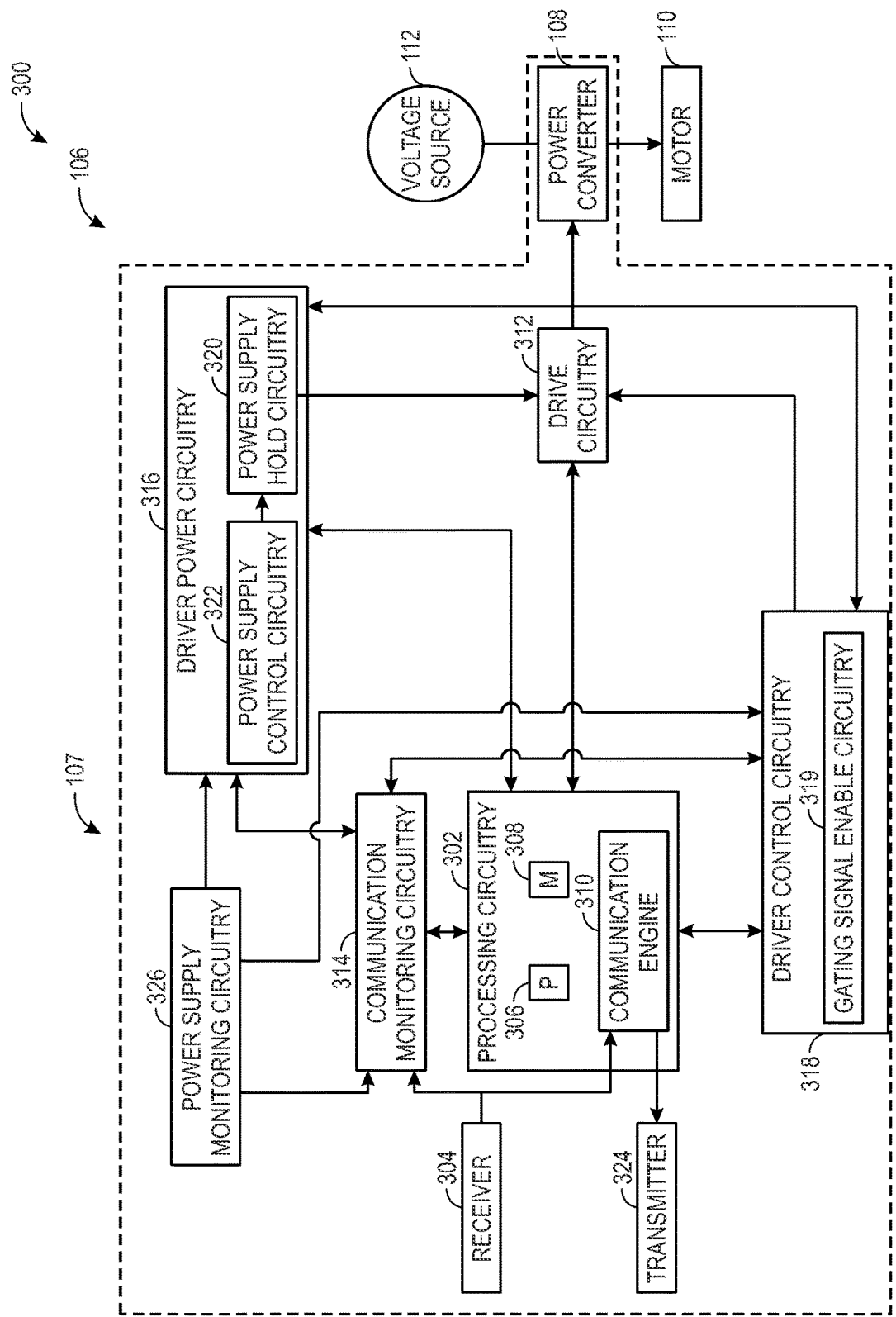
FIG. 3 is a block diagram of circuitry of a power module of the exemplary medium voltage drive of FIG. 1, in accordance with an embodiment.

With the foregoing in mind, FIG. 2 is block diagram 200 of the controller 104 of the medium voltage drive 102, and FIG. 3 is a block diagram 300 of a single power module 106 of the medium voltage drive 102. As illustrated in FIG. 2, the controller 104 may include processing circuitry 202 that includes a processor 204 and a memory 206. The processor 204 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 204 may, in some embodiments, include multiple processors. The memory 206 may include any suitable articles of manufacture that serve as media to store processor-executable code, data, and the like. The memory 206 may store non-transitory processor-executable code used by the processor 204 to perform the presently disclosed techniques.

During normal operation of the medium voltage drive 102, the processing circuitry 202 of the controller 104 may generate one or more messages that may be transmitted to a driver 208 (e.g., driver circuitry 208) of the controller 104 to provide to one or more power module(s) 106 of the medium voltage drive 102 via one or more respective transmitters 210, 212, 214. For example, the power module controller 107 may generate one or more signals to control operation of its corresponding power converter to provide power to the motor 110 based on the messages received from the controller 104. As illustrated in FIG. 2, the processing circuitry 202 may include a communication engine 216 that generates the messages transmitted to the driver 208 based on data received by the processing circuitry 202 from one or more input sources. In some embodiments, the input sources may include one or more sensors associated with the medium voltage drive 102, one or more sensors associated with the motor 110, one or more user inputs, or the like. After the driver 208 of the controller 104 receives the messages from the processing circuitry 202, the driver 208 may transmit the messages to the power modules 106 via the transmitters 210, 212, 214. In certain embodiments, the communication engine 216 of the controller 104 may act as a buffer to temporarily store the messages as the driver 208 transmits the messages to the power module(s) 106 via the transmitters 210, 212, 214. Additionally, the transmitters 210, 212, 214 may convert the messages (e.g., digital signals) received from the driver 208 into a format compatible with the power module(s) 106. In some embodiments, transmitters 210, 212, 214 may convert the messages into a fiber optic signal before the transmitters 210, 212, 214 relay the fiber optic signal to the power module(s) 106. Although three transmitters 210, 212, 214 are illustrated in FIG. 2, it should be understood that any suitable number of transmitters 210, 212, 214 may be included in the controller 104. For instance, the number of transmitters 210, 212, 214 may correspond to the number of power module(s) 106 of the medium voltage drive 102. In this way, the controller 104 may individually control each power module 106 via a respective transmitter 210, 212, 214 of the controller 104.

As illustrated in FIG. 3, the power module controller 107 of the power module (106) may include processing circuitry 302 that may receive the messages from the controller 104 via a receiver 304. In certain embodiments, the receiver 304 may receive the messages as a fiber optic signal and convert the fiber optic signal into a digital signal that may be interpreted by the processing circuitry 302. Like the processing circuitry 202 of the controller 104, the processing circuitry 302 of the power module controller 107 includes a processor 306 and a memory 308. The processor 306 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 306 may, in some embodiments, include multiple processors. The memory 308 may include any suitable articles of manufacture that serve as media to store processor-executable code, data, and the like. The memory 308 may store non-transitory processor-executable code used by the processor 306 to perform the presently disclosed techniques.

After the processing circuitry 302 of the power module controller 107 receives the messages from the controller 104, the processing circuitry 302 may control the operation of its power converter 108 to provide power to the motor 110 based on the messages received from the controller 104. For instance, a communication engine 310 of the processing circuitry 302 may interpret the messages received from the controller 104 and send a command to driver circuitry 312 to generate one or more signals (e.g., pulse width modulation signals) to control the operation of its corresponding power converter 108 to provide power to the motor 110.

During normal operation of the medium voltage drive 102, the processing circuitry 202 of the controller 104 may receive a command to initiate the functional safety mechanism to shutdown the medium voltage drive 102. For example, the processing circuitry 202 of the controller 104 may receive the command to initiate the functional safety mechanism from an e-stop button, a programmable logic controller (PLC), a light curtain, or the like. In response to receiving the command to initiate the functional safety mechanism, the processing circuitry 202 of the controller 104 may send one or more respective commands to corresponding circuitry of the controller 104 to (1) disable one or more transmitters 210, 212, 214 of the controller 104 that may relay messages between the controller 104 and the power module(s) 106 and (2) disable generation of enabling signals that would control the driver 208 of the controller 104 to transmit messages to the to the power module(s) 106 via the transmitters 210, 212, 214. In particular, the processing circuitry 202 of the controller 104 may send a first command to the transmitter control circuitry 218 to turn off the power provided to the transmitters 210, 212, 214. Additionally, the processing circuitry 202 of the controller 104 may send a second command to the driver control circuitry 220 to disable the driver 208 in order to prevent messages from being transmitted from the driver 208 to the transmitters 210, 212, 214. In some embodiments, the processing circuitry 202 of the controller 104 may send the first command to the transmitter control circuitry 218 and the second command to the driver control circuitry 220 at the substantially the same time or simultaneously. In other embodiments, the transmitter control circuitry 218 and/or the driver control circuitry 220 may receive the command to initiate the functional safety mechanism directly (e.g., from the e-stop button, the PLC, the light curtain, or the like).

During normal operation of the medium voltage drive 102, the power module 106 may continuously monitor for gaps in communication from the controller 104 via communication monitoring circuitry 314 (e.g., a communication watchdog timer) in order to initiate the functional safety mechanism. For example, the receiver 304 may send the messages (e.g., digital signal that includes the messages) from the controller 104 to the processing circuitry 302 and the communication monitoring circuitry 314. The communication monitoring circuitry 314 may detect a gap in communication from the controller 104 by analyzing the digital signal from the receiver 304. In some embodiments, a sufficient time period of a gap in communication from the controller 104 to trigger the functional safety mechanism may be greater than or equal to 100 milliseconds. In certain embodiments, the power module 106 may monitor for a loss of communication (e.g., messages) from the controller 104 or an irregular frequency of communication transmission (e.g., an increase or a decrease in frequency of messages received) from the controller 104. In such embodiments, the communication monitoring circuitry 314 may detect the loss of communication or the irregular frequency of communication transmission and trigger the functional safety mechanism.

In response to the communication monitoring circuitry 314 detecting the gap in communication from the controller 104, the communication monitoring circuitry 314 may transmit data indicative of the detected gap to the processing circuitry 302 of the power module 106. The processing circuitry 302 of the power module may then send one or more respective commands to corresponding circuitry of the power module 106 to (1) disable the driver circuitry 312 of the power module 106 and (2) disable generation of enabling signals that would control the driver circuitry 312 to generate and transmit one or more signals (e.g., pulse width modulation signals) to the corresponding power converter 108 to provide power to the motor 110. In particular, the processing circuitry 302 of the power module 106 may send a first command to the driver power circuitry 316 to turn off the power provided to the driver circuitry 312. Additionally, the processing circuitry 302 of the power module 106 may send a second command to the gating control circuitry 318 to disable the driver circuitry 312 in order to prevent the driver circuitry 312 from generating and transmitting the signals to control operation of the corresponding power converter 108 to provide power to the motor 110. As a result, the power module 106 of the medium voltage drive 102 may be disabled and placed in a safe state.

In some embodiments, the processing circuitry 302 of the power module 106 may send the first command to the driver power circuitry 316 and the second command to the gating control circuitry 318 at the substantially the same time or simultaneously. In other embodiments, the driver power circuitry 316 and/or the gating control circuitry 318 may receive a command to initiate the functional safety mechanism directly (e.g., from the communication monitoring circuitry 314 in response to detecting the gap).

As described above, during normal operation of the medium voltage drive 102, the controller 104 may periodically initiate one or more diagnostic tests (e.g., enable tests and power tests) to verify the integrity or the operability of the circuitry that may be used to implement the functional safety mechanism in the controller 104 of the medium voltage drive 102, the circuitry that may be used to implement the functional safety mechanism in each power module 106 of the medium voltage drive 102, or a combination thereof. Referring back to FIG. 2, the processing circuitry 202 of the controller 104 may periodically initiate a diagnostic test to determine whether the transmitter control circuitry 218 may successfully turn off the power provided to the transmitters 210, 212, 214. For instance, the processing circuitry 202 of the controller 104 may send a command to the transmitter control circuitry 218 to generate a test pulse via the power supply control circuitry 222 and provide the test pulse to the power supply hold circuitry 224. The transmitter control circuitry 218 may monitor whether the test pulse causes a disruption in the power signal provided to the transmitters 210, 212, 214. It should be noted that the power supply hold circuitry 224 provides a hold circuit that supplies an additional power signal (e.g., a functional safety power signal) to the transmitters 210, 212, 214 to maintain operation of the transmitters 210, 212, 214 while the diagnostic test is implemented. It should be noted that the functional safety power signal is distinct from the power signal through which the test pulse is transmitted from the power supply control circuitry 222 to the power supply hold circuitry 224. In this way, communication between the controller 104 and the power module(s) 106 is not disrupted during the diagnostic test of the transmitter control circuitry 218.

In some embodiments, the power supply hold circuitry 224 may include a pulse test-latch disposed in the power supply hold circuitry 224 before the hold circuit. The pulse test-latch may receive the test pulse from the power supply control circuitry 222 before it is transmitted to the hold circuit. In response to receiving the test pulse, a clock input of the pulse test-latch may switch to a logical one, thereby causing an output of the pulse test-latch switching to a logical zero. The hold circuit may then receive the test pulse from the pulse test-latch, which is detected, thereby, verifying the ability of the power supply hold circuitry 224 to turn off the power to the transmitters 210, 212, 214. It should be understood that the test pulse does not cause a disruption of the power signal from the hold circuit to the transmitters 210, 212, 214 because a capacitor in the hold circuit does not allow this test pulse through to the transmitters 210, 212, 214.

In response to the output of the pulse test-latch switching to a logical zero, the transmitter control circuitry 218 may send data indicative of a successful diagnostic test of the transmitter control circuitry 218 to the processing circuitry 202 of the controller 104. The processing circuitry 202 of the controller 104 may then store the successful diagnostic test result in the memory 206. However, if the pulse test-latch does not switch to a logical zero, the transmitter control circuitry 218 may send data indicative of an unsuccessful diagnostic test of the transmitter control circuitry 218 to the processing circuitry 202 of the controller 104. If the processing circuitry 202 of the controller 104 receives an unsuccessful diagnostic test result from the transmitter control circuitry 218, the processing circuitry 202 of the controller 104 may initiate the functional safety mechanism described herein.

The processing circuitry 202 of the controller 104 may also periodically initiate a diagnostic test to determine whether the driver control circuitry 220 may successfully turn off generation of enabling signals that would control the driver 208 of the controller 104 to transmit messages to the transmitters 210, 212, 214 that relay the messages to the power module(s) 106. For instance, the processing circuitry 202 of the controller 104 may send a command to the driver control circuitry 220 to generate a test pulse to disable generation of the enabling signals of the driver 208 by the enable signal circuitry 226. The driver control circuitry 220 may monitor whether the test pulse causes a disruption in the enable signal of the enable signal circuitry 226.

Similar to that of the power supply hold circuit 224, the enable signal circuitry 226 may include a pulse test-latch that receives the test pulse. In response to receiving the test pulse, a clock input of the pulse test-latch may switch to a logical one, thereby causing an output of the pulse test-latch switching to a logical zero. In response to the output of the pulse test-latch switching to a logical zero, the driver control circuitry 220 may send a disabling signal to the driver 208 of the controller 104. After the driver 208 receives the disabling signal and subsequently shuts down, the driver 208 may send a signal indicative of a successful shutdown to the driver control circuitry 220, which sends data indicative of a successful diagnostic test of the driver control circuitry 220 to the processing circuitry 202 of the controller 104. Additionally, the driver control circuitry 220 may send an enable signal to the driver 208 shortly after receiving the signal indicative of the successful shutdown of the driver 208. In this way, the driver 208 experiences a short shutdown such that the driver may be re-enabled before any loss of data being transmitted. The processing circuitry 202 of the controller 104 may then store the successful diagnostic test result in the memory 206.

However, if the driver 208 receives the disabling signal and does not successfully shutdown, the driver 208 may send a signal indicative of an unsuccessful shutdown to the driver control circuitry 220, which sends data indicative of an unsuccessful diagnostic test to the processing circuitry 202 of the controller 104. After the processing circuitry 202 of the controller 104 receives an unsuccessful diagnostic test result from the driver control circuitry 220, the processing circuitry 202 of the controller 104 may initiate the functional safety mechanism described herein.

Additionally, with reference to FIG. 3, the processing circuitry 302 of the power module(s) 106 may periodically initiate one or more diagnostic tests to determine whether the driver power circuitry 316 may successfully turn off the power provided to the driver circuitry 312. For instance, the processing circuitry 302 of the power module(s) may send a command to the driver power circuitry 316 to generate a test pulse via the power supply control circuitry 322 and provide the test pulse to the power supply hold circuitry 320. The driver power control circuitry 316 may monitor whether the test pulse causes a disruption in the power signal provided to the power supply hold circuitry 320. It should be noted that the power supply hold circuitry 320 provides a hold circuit that supplies an additional power signal (e.g., a functional safety power signal) to the driver circuitry 312 to maintain operation of the driver circuitry 312 while the diagnostic test is implemented. It also should be noted that the functional safety power signal may be distinct from the power signal through which the test pulse is transmitted from the power supply control circuitry 322 to the power supply hold circuitry 320. In this way, the driver circuitry 312 may still generate one or more signals to control operation of the corresponding power converter 108 to provide power to the motor 110 during the diagnostic test of the drive power circuitry 316.

Similar to the power supply hold circuitry 224 of the controller 104, in some embodiments, the power supply hold circuitry 320 may include a pulse test-latch disposed in the power supply hold circuitry 320 before the hold circuit. The pulse test-latch may receive the test pulse from the power supply control circuitry 322 before it is transmitted to the hold circuit. In response to receiving the test pulse, a clock input of the pulse test-latch may switch to a logical one, thereby causing an output of the pulse test-latch switching to a logical zero. The hold circuit may then receive the test pulse from the pulse test-latch, which is detected, thereby verifying the ability of the power supply hold circuitry 320 to turn off the power to the driver circuitry 312. It should be understood that the test pulse does not cause a disruption of the power signal from the hold circuit to the driver circuitry 312 because the capacitor in the hold circuit does not allow this test pulse to go through to the driver circuitry 312.

In response to the output of the pulse test-latch switching to a logical zero, the drive power circuitry 316 may send data indicative of a successful diagnostic test of the drive power circuitry 316 to the processing circuitry 302 of the power module 106. The processing circuitry 302 of the power module 106 may then transmit the data indicative of the successful diagnostic test to the processing circuitry 202 of the controller 104 via a transmitter 324. The processing circuitry 202 of the controller may then store the data indicative of the successful diagnostic test of the driver power control circuitry 316 in the memory 206 of the processing circuitry 202. In some embodiments, the processing circuitry 302 of the power module 106 may also store the data indicative of the successful diagnostic test of the drive power circuitry 316 in the memory 308.

If the pulse test-latch does not switch to a logical zero, the drive power circuitry 316 may send data indicative of an unsuccessful diagnostic test of the drive power circuitry 316 to the processing circuitry 302 of the power module 106. After the processing circuitry 302 receives the unsuccessful diagnostic test result from the drive power circuitry 316, the processing circuitry 302 may transmit the data indicative of the unsuccessful diagnostic test of the drive power circuitry 316 to the processing circuitry 202 of the controller 104 via the transmitter 324. After the processing circuitry 202 of the controller 104 receives the data indicative of the unsuccessful diagnostic test via a corresponding receiver 228, 230, 232 and receiver circuitry 234, the processing circuitry 202 may then initiate the functional safety mechanism as described herein.

The processing circuitry 302 of the power module(s) 106 may also periodically initiate a diagnostic test to determine whether gating signal enable circuitry 319 of driver control circuitry 318 may successfully turn off generation of enabling signals that would control the driver circuitry 312 of each power module 106 to generate one or more signals to control operation of its corresponding power converter 108 to provide power to the motor 110. For instance, the processing circuitry 302 of the power module 106 may send a command to the gating signal enable circuitry 319 to generate a test pulse to disable generation of the enabling signals of the driver circuitry 312. The gating signal enable circuitry 319 may monitor whether the test pulse causes a disruption in the enable signal of the gating signal enable circuitry 319.

Similar to that of the power supply hold circuit 320, the gating signal enable circuitry 319 may include a pulse test-latch that receives the test pulse. In response to receiving the test pulse, a clock input of the pulse test-latch may switch to a logical one, thereby causing an output of the pulse test-latch switching to a logical zero. In response to the output of the pulse test-latch switching to a logical zero, the gating signal enable circuitry 319 may send a disabling signal to the driver circuitry 312 of the power module 106. After the driver circuitry 312 receives the disabling signal and subsequently shuts down, the driver circuitry 312 may send a signal indicative of a successful shutdown to the gating signal enable circuitry 319, which sends data indicative of a successful diagnostic test of the gating signal enable circuitry 319 to the processing circuitry 302 of the power module 106. The processing circuitry 302 may then transmit the data indicative of the successful diagnostic test of the gating signal enable circuitry 319 to the processing circuitry 202 of the controller 104. The processing circuitry 202 may then store the data in the memory 206 of the processing circuitry 202. In some embodiments, the processing circuitry 302 of the power module 106 may also store the data in the memory 308 of the processing circuitry 302.

Additionally, the gating signal enable circuitry 319 may send an enable signal to the driver circuitry 312 shortly after receiving the signal indicative of the successful shutdown of the driver circuitry 312. In this way, the driver circuitry 312 experiences a short shutdown such that the driver circuitry 312 may be re-enabled before there is any loss of data being sent to the power converter 108.

However, if the driver circuitry 312 receives the disabling signal and does not successfully shutdown, the driver circuitry 312 may send a signal indicative of an unsuccessful shutdown to the gating signal enable circuitry 319, which sends data indicative of an unsuccessful diagnostic test to the processing circuitry 302 of the power module 106. The processing circuitry 302 of the power module 106 may then transmit the data indicative of the unsuccessful diagnostic test to the processing circuitry 202 of the controller 104 via the transmitter 324. The processing circuitry 202 may then initiate the functional safety mechanism as described herein.

In some embodiments, each diagnostic test may be implemented against the corresponding circuitry of the controller 104 and/or the power module(s) 106 at the same time or substantially the same time. In other embodiments, an execution time of each diagnostic test may overlap with at least one other diagnostic test.

Further, the controller 104 may have power supply monitoring circuitry 236 and each power module 106 may have respective power supply monitoring circuitry 326 that continuously verifies that each power supply provides power within an appropriate range to the respective circuitry that may be used to implement the functional safety mechanism in the controller 104 of the medium voltage drive 102 and the respective circuitry that may be used to implement the functional safety mechanism in each power module 106 of the medium voltage drive 102. For example, the appropriate range may be the minimum voltage to maximum voltage that allows the circuitry to operate within its operational limits. If at least one of the power supplies that provides power to the respective circuitry that may be used to implement the functional safety mechanism in the controller 104 or the respective circuitry that may be used to implement the functional safety mechanism in each power module 106 deviates out of range, the power supply monitoring circuitry 236 and/or the power supply monitoring circuitry 326 may send data indicating the deviation to the controller 104 of the medium voltage drive 102. The controller 104 may then initiate the functional safety mechanism described herein.

Technical effects of the present disclosure include providing multiple levels of redundancy by implementing different methods to prevent the transmission of signals from the controller to the power module(s) and different methods to prevent power from being provided to the motor. That is, to prevent the transmission of signals from the controller to the power module(s), the controller of the medium voltage drive may (1) disable the transmitters (e.g., turn off power to the transmitters) and (2) disable generation of the gating signals (e.g., the enabling signals) that would control the driver of the controller to transmit one or more messages to the respective transmitters to relay the messages to the power module(s). Additionally, to prevent power from being provided to the motor, the power module may (1) disable the driver circuitry of the power module (e.g., turn off power to the driver circuitry) and (2) disable generation of the gating signals (e.g., the enabling signals) that would control the driver circuitry of the power module to generate the signals to control the operation of the corresponding power converter to provide power to the motor. Further, one or more diagnostic tests may be implemented within the industrial automation devices to verify the integrity of the circuitry that may be used to implement the functional safety mechanism in the industrial automation devices without disrupting communication between the controller and the power module(s) of the industrial automation devices. In this way, the industrial automation device may continue to operate during the diagnostic tests while certain functional safety standards may be met. Further, the functional safety mechanism described herein provides a simple and cost-effective design as compared to Black Channel communication designs.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory, computer-readable medium associated with an industrial automation device, wherein the non-transitory, computer-readable medium, comprises instructions that when executed by one or more processors, cause the one or more processors to perform operations comprising:
    receiving one or more inputs indicative of a shutdown of one or more power modules of the industrial automation device;
    in response to receiving the one or more inputs:
        transmitting a first command to driver control circuitry to disable a driver communicatively coupled to one or more transmitters, wherein the driver is configured to transmit a continuous control signal via the one or more transmitters to one or more respective power modules to control an operation of a power converter configured to provide power to a motor; and
        transmitting a second command to transmitter control circuitry to prevent power from being provided to the one or more transmitters;
    wherein each power module of the one or more respective power modules is configured to:
        receive the continuous control signal from the driver via the one or more transmitters;
        monitor, at the power module, the continuous control signal for a lack of communication from the driver; and
        in response to detecting the lack of communication from the driver to the power module based on the continuous control signal, utilize a gating signal enable circuitry to disable driver circuitry of the power module configured to control the operation of the power converter to provide power to the motor and prevent power from being provided to the driver circuitry.

2. The non-transitory, computer-readable medium of claim 1, wherein the first command is transmitted to the driver control circuitry and the second command is transmitted to the transmitter control circuitry simultaneously.

3. The non-transitory, computer-readable medium of claim 1, wherein each power module of the one or more respective power modules is configured to disable the driver circuitry of the power module and prevent power from being provided to the driver circuitry at substantially the same time.

4. The non-transitory, computer-readable medium of claim 1, wherein a time period of the lack of communication is based on a transmission rate of the control signal and a safety reaction time.

5. The non-transitory, computer-readable medium of claim 1, wherein the industrial automation device comprises a voltage source drive or a current source drive.

6. A method, comprising:
    receiving, by respective processing circuitry of one or more power modules of an industrial automation device, a continuous control signal from a controller of the industrial automation device, wherein the one or more power modules comprise driver circuitry and a power converter configured to provide power to a motor based on the signal;
    detecting, by the respective processing circuitry, a lack of communication from the controller based on the continuous control signal dropping out of communication with the power module; and
    in response to detecting, at the power module, the continuous control signal dropping out of communication with the power module:
        transmitting, by the respective processing circuitry, a first command to gating signal enable circuitry to disable the driver circuitry; and
        transmitting, by the respective processing circuitry, a second command to driver power circuitry to prevent power from being provided to the driver circuitry.

7. The method of claim 6, comprising transmitting, by the controller of the industrial automation device, the control signal to each power module of the one or more power modules.

8. The method of claim 6, comprising receiving, by the controller of the industrial automation device, one or more inputs indicative of a shutdown of the one or more power modules.

9. The method of claim 6, comprising disabling, by the controller of the industrial automation device, a driver of the controller configured to transmit the control signal to each power module of the one or more power modules via one or more respective transmitters of the controller.

10. The method of claim 6, comprising preventing, by the controller of the industrial automation device, power from being provided to one or more respective transmitters of the controller configured to transmit the control signal to each power module of the one or more power modules.

11. The method of claim 6, comprising initiating, by the respective processing circuitry, one or more diagnostic tests configured to verify a first ability of the gating signal enable circuitry to disable the driver circuitry, a second ability of the driver power circuitry to prevent power from being provided to the driver circuitry, or both.

12. The method of claim 11, comprising:
    receiving, by the processing circuitry, data indicative of an unsuccessful diagnostic test of the one or more diagnostic tests; and transmitting, by the processing circuitry, the data indicative of the unsuccessful diagnostic test to the controller of the industrial automation device.

13. The method of claim 12, comprising:
receiving, by the controller of the industrial automation device, the data indicative of the unsuccessful diagnostic test;
disabling, by the controller of the industrial automation device, a driver of the controller configured to transmit the control signal to each power module of the one or more power modules via one or more respective transmitters of the controller; and
preventing, by the controller of the industrial automation device, power from being provided to one or more respective transmitters of the controller configured to transmit the control signal to each power module of the one or more power modules.

14. A system, comprising:
a controller, comprising:
a driver communicatively coupled to one or more transmitters, wherein the driver is configured to transmit a continuous control signal via the one or more transmitters to one or more respective power modules; and
first processing circuitry configured to:
receive one or more inputs indicative of a shutdown of the one or more respective power modules;
in response to receiving the one or more inputs:
transmitting a first command to driver control circuitry communicatively coupled to the driver, wherein the first command is configured to disable the driver; and
transmitting a second command to transmitter control circuitry communicatively coupled to the transmitter, wherein the second command is configured to prevent power from being provided to the one or more transmitters; and
a power module of the one or more respective power modules, wherein the power module is configured to control an operation of a power converter to provide power to a motor, wherein the power module is communicatively coupled to a first transmitter of the one or more transmitters, and wherein the power module comprises:
driver circuitry configured to control the operation of the power converter; and
second processing circuitry, at the power module, configured to:
receive the continuous control signal from the first transmitter;
detect a lack of communication from the driver based on the continuous control signal;
in response to detecting the lack of communication:
transmit a third command to gating signal enable circuitry at the power module to disable the driver circuitry; and
transmit a fourth command to driver power circuitry to prevent power from being provided to the driver circuitry.

15. The system of claim 14, wherein each power module of the one or more respective power modules comprises a communication timer that is configured to monitor the continuous control signal for the lack of communication.

16. The system of claim 14, wherein the controller is configured to initiate one or more diagnostic tests to verify an ability of the driver control circuitry to disable the driver.

17. The system of claim 14, wherein the controller is configured to initiate one or more diagnostic tests to verify an ability of the transmitter control circuitry to prevent power from being provided to the one or more transmitters.

18. The system of claim 14, wherein each power module of the one or more respective power modules is configured to initiate one or more diagnostic tests configured to verify an ability of the gating signal enable circuitry to disable the driver.

19. The system of claim 14, wherein each power module of the one or more respective power modules is configured to initiate one or more diagnostic tests configured to verify an ability of the driver power circuitry to prevent power from being provided to the driver circuitry.

20. The system of claim 14, wherein the one or more inputs indicative of the shutdown of the one or more respective power modules are associated with an e-stop button, a programmable logic controller (PLC), a light curtain, or a combination thereof.

* * * * *